Patented Dec. 16, 1947

2,432,601

UNITED STATES PATENT OFFICE 2,432,601

POLYMERS OF ALPHA-METHYLENE CYCLIC ACETALS

Richard Haven Wiley, Lancaster Village, Del., assignor to E. I. du Pont de Nemours & Company, Wilmington, Del., a corporation of Delaware No Drawing. Application December 12, 1942, Serial No. 468,844

13 Claims. (Cl. 260—84)

This invention relates to polymers of 5- and 6-membered cyclic acetals of alpha-methylene, aliphatic aldehydes and ketones, i. e. of oxo compounds, their copolymers with other polymerizable vinyl and vinylidene compounds and methods of obtaining them.

Cyclic acetals of alpha-methylene aliphatic aldehydes, such as 2-vinyl-1,3-dioxolane and 2-vinyl-4-methyl-1,3-dioxane, have never been converted to polymeric materials, either by polymerization alone or in combination with other polymerizable vinyl or vinylidene compounds. One object of this invention is therefore the preparation of polymers of cyclic acetals of alphamethylene aliphatic aldehydes and ketones.

Polymeric esters of acrylic and methacrylic acids are widely used in many applications in the art of plastics but, while highly useful, are capable of improvement. They are defective for use in some applications in having insufficiently high softening point, insufficient flexural strength and insufficient surface hardness. Another object of this invention is therefore the preparation of copolymers of cyclic acetals of alpha-methylene aldehydes and ketones with acrylic and methacrylic esters or with polymerizable monoethylenic vinyl or vinylidene compounds to obtain products improved in softening point, hardness and strength.

These objects are accomplished by the following invention wherein a monomeric monocyclic 5 to 6 membered cyclic acetal of up to sixteen carbon atoms of an alpha-methylene oxo compound, which is hydrocarbon except for the two acetal oxygens, is polymerized either alone or with a polymerizable vinyl, vinylidene, acrylyl, or methacrylyl compound with the aid of light, heat and/or peroxides.

Acetals having 5 to 6 members in the ring of which two are oxygen which are joined to the same ring carbon which is also attached to a carbon which is joined by an ethylenic double bond to a methylene group may be prepared from alpha-methylene aliphatic oxo compounds, i. e. ketones and aldehydes, by reaction with 1,2- and 1,3-glycols. These acetals can be polymerized by ultra-violet irradiation of a solution of an organic peroxide in the monomeric unsaturated cyclic acetal under nitrogen at 0–100° C. and preferably at 20–40° C. A similar type polymer can be prepared by heating the monomeric cyclic acetal at 50–120° C. in a nitrogen atmosphere and in the presence of a small amount of its own peroxide formed by bubbling oxygen through the monomer until the desired peroxide content is obtained. Copolymers of the acetals with polymerizable vinyl, vinylidene, acrylyl, or methacrylyl compounds can also be obtained by these methods.

As an alternative method, it is convenient to polymerize the acetals alone or with polymerizable vinyl, vinylidene, acrylyl, or methacrylyl compounds by an emulsion method. This is effected by the agitation of the materials to be polymerized in a system comprising a long-chain dispersing agent, a catalyst which is a salt of perdisulfuric acid, and water to which sufficient sodium hydroxide has been added to render the system alkaline. This system disperses the monomeric materials in the form of an emulsion, and then the polymerization is effected by heating and agitating at 35–60° C. The polymer may coagulate as it is formed in the system, or it can be coagulated by the addition of appropriate agents, and is then removed by filtration, washed, and dried.

The granulation technique can also be employed in effecting copolymerization. This is carried out in a system comprising a low proportion of the unsaturated cyclic acetal and the polymerizable vinyl, vinylidene, acrylyl, or methacrylyl compound, a catalyst such as benzoyl peroxide, a granulating agent such as the sodium salt of polymethacrylic acid, a buffering agent such as bisodium hydrogen phosphate, and water. This mixture is agitated vigorously and heated for several hours until polymerization is essentially complete. It is then allowed to cool while continuing the agitation. The copolymer which separates in fine white granules upon stopping the agitation is filtered and washed. The copolymer obtained can be molded to clear, colorless objects which under the preferred circumstances have increased softening point, improved stiffness, improved impact strength, and improved flexural strength over the unmodified control polymer. It is to be emphasized that in order to obtain improved properties only small proportions, ca. 0.1–5%, of the unsaturated cyclic acetal should be used.

The more detailed practice of the invention is illustrated by the following examples, wherein parts given are by weight. There are of course many forms of the invention other than these specific embodiments.

Example I

A solution of 52.5 parts of dry hydrogen chloride in 120 parts of ethylene glycol, prepared by passing dry hydrogen chloride gas into ethylene glycol, contained in a vessel equipped with a reflux condenser, a thermometer, a dropping funnel, and a sealed stirrer, was maintained at 4° C. or below while 80 parts of acrolein was added slowly from the dropping funnel to the well-stirred reaction mixture (1½ hours). After the addition was complete, the stirring was stopped and the mixture allowed to come to room temperature (2 hours). The reaction mixture, which now consisted of two layers was poured into 300 parts of a saturated sodium chloride solution, and the excess hydrogen chloride immediately neutralized with excess solid sodium bicarbonate. Eighty parts (80) of diethyl ether was then added to the mixture and the organic layer separated from the aqueous layer. The aqueous layer was then extracted three times with diethyl ether, constituting 75 part portions. The combined organic solution was then washed with 200 parts of a 20% sodium bisulfite solution and 200 parts of a saturated sodium chloride solution. The ether solution was then dried over anhydrous sodium sulfate containing a small amount of anhydrous potassium carbonate. After the ether has been removed from the dried solution by distillation, the residue was distilled at 17 mm., and in this manner 125 parts of 2-(beta-chlorethyl)-1,3-dioxolane was obtained distilling at 74-75° C.

Into a container equipped with a dropping funnel, a sealed stirrer, a short fractionating arm with a condenser arranged for fractional distillation was placed 450 parts of potassium hydroxide pellets. The flask was immersed in a bath at 160° C.±5° C. After the potassium hydroxide had fused stirring was begun, and 217 parts of 2-(beta-chlorethyl)-1,3-dioxolane was added slowly from the funnel onto the surface of the stirred molten potassium hydroxide. After a small amount of 2-(beta-chlorethyl)-1,3-dioxolane had been added to the reaction flask a distillate, 2-vinyl-1,3-dioxolane, began to pass over. The rate of addition of the 2-(beta-chlorethyl)-1,3-dioxolane was adjusted to approximate the rate of distillation while maintaining the distillation temperature between 112-116° C. In this manner 140 parts of 2-vinyl-1,3-dioxolane was obtained which on fractionation distilled at 115.5-116.5° C. at atmospheric pressure.

*Example II*

A quartz tube containing 20 parts of 2-vinyl-1,3-dioxolane, 0.028 part of lauroyl peroxide, 0.02 part of benzoin, and swept free of air by oxygen-free nitrogen, was placed 15 inches from a mercury vapor arc. After irradiation for 38 days the solution had become quite viscous. The polymer obtained (20 parts) possessed physical properties quite similar to those of the product in Example I.

*Example III*

To a mixture of 1.26 parts of a commercial dispersing agent which contained as its active ingredient 33% of the sodium salt of sulfonated paraffin oil prepared as described in copending application Serial No. 352,797 filed August 15, 1940, 2.08 parts of ammonium persulfate, 0.2 part of sodium hydrosulfite, 2000 parts of an aqueous phase whose pH had been adjusted to 11 with sodium hydroxide solution, was added 100 parts of 2-vinyl-1,3-dioxolane. This mixture was placed in a reaction chamber, the chamber flushed with oxygen-free nitrogen, closed, and heated with agitation at 65° C. for 18 hours. At the end of this time 14 parts of a white solid polymer had separated which was filtered, washed, and dried. The product was insoluble in common organic solvents and water, and softened at 230 C. when heated on a copper block. It was molded at 230 C. and 3000 lb./sq. in. pressure to brown translucent objects.

*Example IV*

The unsaturated cyclic acetal, 2-vinyl-4-methyl-1,3-dioxane, was prepared in the following manner:

Into 220 parts of 1,3-butylene glycol contained in a 3-neck container equipped with a thermometer, condenser, an efficient stirrer, and an inlet tube extending below the surface of the liquid was passed 43 parts of dry hydrogen chloride. The reaction mixture was maintained at 0-5° C. by external cooling. After the hydrogen chloride had been added, 60 parts of acrolein was introduced slowly into the well stirred solution of hydrogen chloride in 1,3-butylene glycol at such a rate that the temperature of the reaction mixture remained below 4° C. External cooling was necessary. After all the acrolein had been added, the reaction mixture was poured with vigorous stirring into a saturated sodium bicarbonate solution containing sufficient sodium bicarbonate to neutralize all the hydrogen chloride. After all the hydrogen chloride had been neutralized, 200 parts of an ether-benzene solution containing 40 parts of ether, was added to the mixture. The water-insoluble layer was washed with 100 parts of an aqueous sodium bisulfite solution, containing 20 parts of sodium bisulfite, and then washed with 100 parts of a saturated sodium bicarbonate solution. The solution was dried over anhydrous potassium carbonate and filtered. After the ether and benzene had been removed, the residue was fractionally distilled. A fraction of 98 parts, distilling at 90.5-92° C./22 mm. mercury pressure, was obtained which had the following physical constants.

| | Calculated | Found |
|---|---|---|
| Chlorine, per cent | 21.55 | 21.69 |
| Refractive index, $25_D^{25}$ | | 1.4482 |
| Density, 25° | | 1.0881 |

The chlorine analysis indicates that the compound was 2-(beta-chloroethyl)-4-methyl-1,3-dioxane.

Conversion of the 2-(beta-chloroethyl-4-methyl-1,3-dioxane to 2-vinyl-4-methyl-1,3-dioxane was accomplished in the following manner:

In a reaction vessel equipped with an addition means, efficient sealed stirrer, and fractionating column was placed 457 parts of pellet potassium hydroxide. The vessel and its contents were heated in a bath to 200° C. and 88 parts of 2-(beta-chloroethyl)-4-methyl-1,3-dioxane was added slowly through the addition means to the well stirred molten potassium hydroxide at such a rate that the reflux temperature of the distillate passing through the fractionating column was 145-148° C. In this manner 68 parts of crude 2-vinyl-4-methyl-1,3-dioxane was obtained. The distillate was dried over magnesium sulfate. After drying and filtering, the distillate was fractionated. In this manner 17 parts of 2-vinyl-4-methyl-1,3-dioxane was obtained. The 2-vinyl-4-methyl-1,3-dioxane had the following properties:

| | Calculated | Found |
|---|---|---|
| Carbon, per cent | 65.63 | 66.10 |
| Hydrogen, per cent | 9.38 | 9.29 |
| Refractive Index $D^{25}$ | | 1.4372 |
| Density, 25° | | 0.9706 |
| Molecular Refraction | 35.1 | 34.5 |

Oxygen was bubbled through 20 parts of the 2-vinyl-4-methyl-1,3-dioxane until it contained about 1% peroxide. The resulting product was heated in an oxygen-free nitrogen atmosphere at 120° C. for 40 hours. During heating the liquid monomer became very viscous, and finally no reflux was evident. At this stage the residue was heated at 100° C. under 1 mm. mercury pressure for one hour to remove any volatile material. In this manner, 15 parts of a light amber-colored viscous polymer was obtained.

*Example V*

To a mixture of 5 parts of a commercial dispersing agent which contains as its active ingredient 32% of the sodium salt of sulfonated paraffin oil, 8 parts of borax, 0.4 part of ammonium persulfate, 85 parts of water were added 4 parts of 2-vinyl-1,3-dioxolane and 36 parts of methyl methacrylate. This mixture was placed in a reaction chamber, the chamber flushed with oxygen-free nitrogen, closed, and heated with agitation at 40° C. for 20 hours. The methyl methacrylate/2-vinyl-1,3-dioxolane copolymer was obtained as a latex which was coagulated by the addition of aluminum sulfate solution. The coagulated precipitate was filtered, washed with water, and dried. In this manner, 40 parts of a white powdery polymer was obtained. The copolymer was readily molded at 160° C., 1000 lb./sq. in. pressure for one minute to transparent colorless objects which softened at 113° C. as compared to 103° C. for a control polymer prepared from methyl methacrylate under the same conditions. The following standard procedure is used to determine the softening points:

When a thermoplastic material is heated, it almost invariably softens very gradually, the sample changing from a rigid piece to one which is pliable. Therefore, these softening points are arbitrary standards which are determined as follows: a bar of polymer, 2.5″ x 0.5″ x 0.05″ in size, molded under the conditions mentioned above, is placed in an oil bath which is heated with good stirring so that the temperature increases at the rate of 2–3° C. per minute. One end of the bar is fastened in a fixed slot and on the other end of the bar is placed a weight of 27.5 grams. The softening point is taken as that temperature at which the bar has sagged 0.06 inch.

*Example VI*

A solution containing 3 parts of 2-vinyl-1,3-dioxolane containing .014% peroxide, prepared as described in Example I, and 27 parts of methyl methacrylate was heated under an oxygen-free nitrogen atmosphere at 100° C. After 16 hours the material had been converted to a hard, colorless glass. The copolymer was dissolved in acetone and reprecipitated by adding the acetone solution to water. The precipitated copolymer was filtered and dried. It was molded at 160° C., 1000 lbs./sq. in. pressure for one minute to colorless, transparent objects which softened at 107° C. as determined by the softening point method described above. The product had a molecular weight in the range of 20,000 as determined by the intrinsic viscosity method described in U. S. 2,130,948.

*Example VII*

To a mixture of 5 parts of a commercial dispersing agent which contains as its active ingredient 33% of the sodium salt of sulfonated paraffin oil, 8 parts of borax, 0.4 part of ammonium persulfate, and 85 parts of water, were added 36 parts of methyl methacrylate and 4 parts of 2-vinyl-4-methyl-1,3-dioxane. This mixture was agitated and heated at 40° C. in an atmosphere of oxygen-free nitrogen in a closed vessel. The methyl methacrylate/2-vinyl-4-methyl-1,3-dioxane copolymer was obtained in the form of a latex which was coagulated by the addition of aluminum sulfate solution. The coagulated polymer was filtered, washed, and dried in a 100° C. vacuum oven. In this manner 40 parts of a white powdery polymer was obtained. The copolymer was readily molded at 160° C., 1000 lbs./sq. in. pressure for one minute to colorless, transparent objects. which softened at 111° C., determined by the standard procedure described above, as compared to 103° C. for a control polymer of methyl methacrylate prepared under the same conditions.

*Example VIII*

To a mixture of 5 parts of a commercial dispersing agent containing as its active ingredient 33% of the sodium salt of sulfonated paraffin white oil, 8 parts of borax, .4 part of ammonium persulfate, and 85 parts of water were added 36 parts of acrylonitrile and 4 parts of 2-vinyl-1,3-dioxolane. The mixture was heated with agitation at 40° C. for 20 hours under an oxygen-free nitrogen atmosphere in a closed vessel. The coagulated copolymer was filtered, washed, and dried at 100° C. In this manner 24 parts of a white powdery polymer was obtained which was insoluble in most organic solvents except dimethyl formamide. On heating on a Macquenne block the polymer softened at 140° C. It was molded at 190° C., 300 lbs./sq. in. for 2 minutes, to light brown translucent objects which did not soften at 150° C. as determined by the standard method described above. The copolymer analysed for 24.21% nitrogen as compared to 26.41% nitrogen in acrylonitrile.

*Example IX*

A series of copolymers of methyl methacrylate with varying amounts of 2-vinyl-1,3-dioxolane was prepared as follows:

Vessels transparent to light and containing 20 parts of a mixture of methyl methacrylate and the proportion, indicated below, of 2-vinyl-1,3-dioxolane, 0.028 part of lauroyl peroxide, and 0.02 part of benzoin, which mixtures were blanketed with oxygen-free nitrogen, were placed 15 inches from a mercury vapor arc and exposed to the ultraviolet rays for 5 days. At the end of this time the mixtures had polymerized to hard, transparent, colorless copolymers. The properties of the copolymers are listed in the table below. The data illustrate how the softening point, as determined on a Macquenne block, varies with the 2-vinyl-1,3-dioxolane content.

| Per Cent 2-Vinyl-1,3-Dioxolane in Original Monomer Mixture | Softening Point |
|---|---|
| | ° C. |
| 0 | 132 |
| 2 | 136 |
| 5 | 140 |

*Example X*

A glass vessel containing 19.6 parts of vinyl acetate, 0.4 part of 2-vinyl-1,3-dioxolane, 0.028 part of lauryl peroxide and .02 part of benzoin, in which the air was replaced with oxygen-free nitrogen, was placed 15 inches from a mercury vapor arc and exposed to ultraviolet for 5 days. In this manner 20 parts of a clear, hard polymer was obtained.

*Example XI*

To 1.25 parts of a commercial dispersing agent consisting of 33% of the sodium salt of sulfonated paraffin white oil were added 1.5 parts of dibasic sodium phosphate dodecahydrate, 0.2 part of ammonium persulfate, 0.05 part of sodium hydrosulfite, and 100 parts of water. The pH of the mixture was adjusted to 7.6 and 36 parts of styrene and 5 parts of 2-vinyl-1,3-dioxolane were then added. The resulting mixture is agitated and heated at 40° C. for 28 hours in an atmosphere of oxygen-free nitrogen in a closed vessel. The mixture assumed the appearance of a rubber-like latex and had a pH of 7.1. The latex was diluted with 400 parts of water, and then steam distilled for 30 minutes to remove unpolymerized monomer. The hot mixture was then diluted with 515 parts of a 3% aqueous aluminum sulfate solution. The coagulated copolymer was filtered, washed, and dried (for about 18 hours) in a 100° C. vacuum oven. Thirty parts of a white powdery copolymer was then obtained which was molded in the usual manner to a light yellow, translucent chip. The softening point of the copolymer, as determined by the method described above was 104.5° C. as compared with the usual softening point of 95–100° C. for unmodified styrene polymers.

*Example XII*

A mixture of 1200 parts of water, 14 parts of dibasic sodium phosphate dodecahydrate, 120 parts of a 1% aqueous solution of the sodium salt of polymethacrylic acid as a granulating agent, 693 parts of methyl methacrylate monomer, 7 parts of 2-vinyl-4-methyl-1,3-dioxane, 14 parts of stearyl alcohol, and 1.75 parts of benzoyl peroxide was charged into a glass-lined autoclave equipped with a stainless steel stirrer, thermocouple wells, and an outside pressure gauge. The autoclave was sealed and heated to 122° C. during 20 minutes. When the temperature reached 122° C. the reaction occurred very readily, and a pressure of 60 lbs./sq. in. was developed. The polymerization appeared to be nearly complete at the end of 2 minutes, but the temperature was maintained above 100° C. for an additional hour to insure completion of the reaction. On cooling the reaction mixture the product appeared as medium to fine granules. The copolymer was filtered, washed, and dried to constant weight, and in this manner 668 parts of white granular copolymer was obtained.

The polymer was slabbed and chopped into particles for convenient use in the molding machine. The copolymer was molded in a de Mattia 1-oz. injection molding machine, using the following conditions: 220–230° C., 22,450–24,700 lbs./sq. in. pressure, and a 60-second molding cycle. The polymer molded unusually well and the molded bars were colorless and transparent with a brilliant surface. The copolymer had improved properties over unmodified methyl methacrylate polymer, as demonstrated in the table below:

| Sample | Softening Temp., °C. | Stiffness, mm. | Impact Strength, foot pounds | Flexural Strength |
|---|---|---|---|---|
| Copolymer | 89.5 | 1.82 | .440 | 14,475 |
| Unmodified Polymethyl Methacrylate | 64 | 2.32 | .406 | 10,775 |

The values for stiffness are arbitrary values and purely empirical. The stiffness value represents the number of millimeters that a standard impact bar 5" x ½" x ⅛" in size will sag when a load of 600 g. is placed on the center of the bar for 5 seconds.

The impact strength is measured by the standard method set up by A. S. T. M., Committee D-256-38, and described in A. S. T. M. Book of Standards Supplement, 1941, part 3, p. 339. The flexural strength is determined by a method described in "Strength of Materials," Poorman, McGraw-Hill (1929) pp. 98–103 and in "Steel Construction," American Institute of Steel Construction, 1st ed., (1930) p. 71, p. 134.

*Example XIII*

To a mixture of 1200 parts of water, 14 parts of dibasic sodium phosphate dodecahydrate, and 120 parts of a 1% aqueous solution of the sodium salt of polymethacrylic acid as a granulating agent were added 693 parts of methyl methacrylate monomer, 7 parts of 2-vinyl-1,3-dioxolane, 14 parts of stearyl alcohol, and 1.75 parts of benzoyl peroxide. The mixture was charged into a glass-lined autoclave equipped as described in Example XIII, and polymerized under the same conditions. In this manner 627 parts of a white granular copolymer was obtained.

The copolymer was injection molded in a de Mattia 1-oz. injection molding machine under the following conditions: 210–230° C., 22,500–25,000 lbs./sq. in., and a 60-second molding cycle. Colorless transparent molded articles were obtained which had the following properties as compared with an unmodified methyl methacrylate polymer:

| Sample | Softening Temp., °C. | Stiffness, mm. | Impact Strength, foot pounds | Flexural strength, lb./sq. in. |
|---|---|---|---|---|
| Copolymer | 83 | 1.80 | .424 | 15,450 |
| Unmodified Polymethyl Methacrylate | 64 | 2.32 | .407 | 10,775 |

In the process of this invention there may be polymerized any 5 to 6 membered monomeric, monocyclic cyclic acetal of up to sixteen carbon atoms having on the acetal (ketaldonyl or oxocarbonylic) carbon, i. e., that between the two ring acetal oxygens, a hydrocarbon radical having a methylene ($CH_2$) group joined by an ethylenic double bend to the carbon attached to the acetal carbon. These acetals may be formulated as follows:

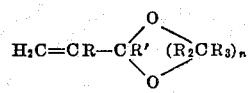

where $R$, $R^1$, $R^2$, and $R^3$ are hydrogen or monovalent hydrocarbon radicals, $n$ is 2 to 3 and the total number of carbons in the acetal is not more than sixteen.

Thus, there may be employed, instead of the cyclic acetals of the examples, the following: 2-isopropenyl - 1,3 - dioxolane, 2 - isopropenyl - 4 - methyl - 1,3 - dioxolane, 2 - isopropenyl - 4 - methyl - 1,3 - dioxane, 2,4,4,5,5 - pentamethyl-2-vinyl-1,3-dioxane, 2-methyl-2-vinyl-1,3-dioxane, 2-vinyl-2-phenyl-1,3-dioxolane, 2-vinyl-2-cyclohexyl - 4 - methyl - 1,3 - dioxane, and 2-vinyl-2-phenyl - 4,4,5,5 - tetramethyl -1,3- dioxane. The alpha methylene acetals may conveniently be prepared as in Example IV from alpha methylene aldehydes, or ketones, e. g., acrolein, methyl vinyl ketone, methacrolein, phenyl vinyl ketone, and cyclohexyl vinyl ketone or from beta-chloro aldehydes and ketones, e. g., beta-chloropropionaldehyde, beta chloroethyl methyl ketone, and beta chloroethyl phenyl ketone. The alpha methylene aldehydes, e. g., alpha-ethacrolein, alpha-methacrolein, etc. may be prepared by the process of U. S. 2,294,955 to J. H. Brant. The alpha methylene aldehydes and ketones are reacted with (1,2 or 1,3) glycols including ethylene, 1,3-butylene, trimethylene, and 1,2-propylene glycols, butanediol-1,2, butanediol-2,3, 2-methylpropanediol-1,2, and pinacol.

These acetals can be polymerized or copolymerized under the influence of heat or actinic light in the presence of organic peroxide catalysts. Polymerization can also be affected by an emulsion process in which the polymerizable monomers are dispersed or emulsified in a system containing a catalyst, a dispersant, and water and are then polymerized by heating and agitating. The polymer is obtained either in the form of a latex or a coagulum. If a latex is produced, it is coagulated by means of an aqueous aluminum sulfate solution, filtered, and washed thoroughly to remove the dispersing agent. In the practice of this invention a large variety of commercially available dispersing agents are operable. Among these are the salts of fatty acids, long chain sulfonates and sulfates such as sodium oleyl sulfate, sodium pentadecane-8-sulfate, and sodium tri-isopropylnaphthalenesulfonate. Also, suitable are quaternary ammonium salts and betaines of long chain hydrocarbons such as stearyltrimethylammonium bromide and hydroxypropyl-C-cetylbetaine. A class which is particularly useful is that of the acid-stable dispersing agents comprising acyclic hydrocarbons of 12 to 18 carbon atoms substituted with only one nitrogen-free anionic solubilizing group. The term "acid-stable" refers to solubilizing groups whose activity is unaffected in media of mild acidity, such as pH 3–5. Although ammonium persulfate is a preferred catalyst, other persulfates such as potassium persulfate and sodium persulfate, peroxides such as benzoyl peroxide, hydrogen peroxide, succinoyl peroxide, and various per salts such as perborates are suitable. While the emulsion polymerization can be carried out using temperatures from room temperature up to 90° C., it is generally more convenient to use temperatures in the range of 40–65° C.

Polymers and copolymers of the alpha methylene acetals may also be prepared by the granulation technique, a preferred method, wherein the unsaturated materials to be copolymerized are rapidly stirred and heated in a system comprising water, a buffering agent, a catalyst, and a granulating agent, such as the sodium salt of polymethacrylic acid. It is characteristic of this system that the polymer does not ordinarily take the form of an emulsion but rather is formed into small granules the major portion of which settle out when agitation is stopped. This fact is of considerable importance in that the isolation of the polymer is accomplished more easily, and the polymer is easier to filter and wash. Whereas the sodium salt of polymethacrylic acid has been indicated in the examples, a large number of other granulating agents, such as partially hydrolyzed polyvinyl acetate, methyl-starch, pectin, and agar-agar, are suitable. In place of the sodium hydrogen phosphate used to control the pH of the solution, a wide variety of buffering agents such as citrates, acetates, and other phosphates are suitable. It is convenient to utilize organic peroxides such as benzoyl peroxide, lauroyl peroxide, succinoyl peroxide and ascaridole. Also suitable are inorganic peroxides such as hydrogen peroxide. The amount of catalyst will, in general, have an effect on the properties of the copolymer and will be chosen with this and with the desired speed of reaction in mind. Although the amount of catalyst such as benzoyl peroxide can be varied from 0.1% to 5%, concentrations in the range of 1–2% are preferable. It is most convenient to carry out the polymerizations at reflux temperatures, but lower reaction temperatures which necessitate longer reaction times, or higher reaction temperatures which involve the use of pressure equipment, are quite feasible and in some instances desirable.

Polymers can be prepared in bulk by heating the unsaturated cyclic acetals in the presence of an organic peroxide at temperatures ranging from 40° C. to 150° C., but it is usually more convenient to employ temperatures in the range of 100–150° C. Organic peroxides in general are suitable, e. g., benzoyl peroxide, succinoyl peroxide, lauroyl peroxide, and others. It has been found preferable to employ a peroxide of the monomer which is to be polymerized. The peroxide is very conveniently prepared in situ by bubbling oxygen through the unsaturated cyclic acetal until the desired peroxide concentration is obtained. Concentrations of the monomer peroxide can be employed varying from .01 to 5%, although the preferred concentration is 0.1–2%. Polymerization is then conducted in the usual manner by heating the solution of the peroxide in the monomer until polymerization occurs. Similarly, copolymerizations in bulk can be catalyzed by peroxide-type catalysts. Peroxides derived from the acetals have been found particularly effective as catalysts for accomplishing the polymerization and copolymerization of the unsaturated cyclic acetals.

Copolymers of the alpha, beta-ethylenically unsaturated acetals with polymerizable vinylidene compounds containing a carboxylic ester group may be prepared by the above method. Any polymerizable vinylidene compound containing a carboxylic ester group may be employed including vinyl acetate and other vinyl esters of organic acids, and acrylic and methacrylic esters.

Although copolymers of the unsaturated cyclic acetals with various proportions of the polymerizable vinyl, vinylidene, acrylyl, or methacrylyl compounds can be prepared, greatest improvement in properties results when low proportions of the unsaturated 5- and 6-membered cyclic acetals are used. The maximum softening point of the methyl methacrylate copolymers is reached before 10% 2-vinyl-1,3-dioxolane has been used, and at 10% concentrations of 2-vinyl-1,3-dioxolane the softening point of the copolymers is decreasing. Therefore, the preferred compositions of copolymers are represented by those containing low proportions, e. g., 0.1–5%, of the 5- and 6-membered cyclic acetals.

The polymers and copolymers of this invention may be employed as adhesives, plasticizers, and as softening agents for natural and synthetic polymers. They are also useful as binders for abrasives, wood, paper, and a considerable variety of cellulosic and fibrous materials. The copolymers of this invention are useful in the production of a variety of molded products such as combs, dentures, lenses, jewelry, electrical equipment, automobile accessories, and drafting equipment.

The above description and examples are intended to be illustrative only. Any modification of or variation therefrom which conforms to the spirit of the invention is intended to be included within the scope of the claims.

The term "vinylidene" is generic to vinyl, acrylic, and methacrylic compounds.

What is claimed is:

1. An interpolymer of a vinylidene compound containing a carboxylic ester group with from 0.1 to 5%, based on said vinylidene compound, of a monomeric, 2-vinyl substituted-1,3-dioxacycloalkane of five to six annular atoms which 2-vinyl substituted compound has five to sixteen carbons, is hydrocarbon except for the two oxa oxygens, and has the unsaturation of the vinyl group as its only acyclic unsaturation.

2. An interpolymer of a vinylidene compound containing a carboxylic ester group with from 0.1 to 5%, based on said vinylidene compound, of 2-vinyl-1,3-dioxolane.

3. An interpolymer of a vinylidene compound containing a carboxylic ester group with from 0.1 to 5%, based on said vinylidene compound, of 2-vinyl-4-methyl-1,3-dioxane.

4. An interpolymer of methyl methacrylate with from 0.1 to 5%, based on the methyl methacrylate, of a monomeric, 2-vinyl substituted-1,3-dioxacycloalkane of five to six annular atoms which 2-vinyl substituted compound has five to sixteen carbons, is hydrocarbon except for the two oxa oxygens, and has the unsaturation of the vinyl group as its only acyclic unsaturation.

5. An interpolymer of methyl methacrylate with from 0.1 to 5%, based on the methyl methacrylate, of 2-vinyl-1,3-dioxolane.

6. An interpolymer of methyl methacrylate with from 0.1 to 5%, based on the methyl methacrylate, of 2-vinyl-4-methyl-1,3-dioxane.

7. Process which comprises subjecting to polymerizing influences, including the aid of a catalyst, a polymerizable composition comprising a vinylidene compound containing a carboxylic ester group and 0.1 to 5%, based on said vinylidene compound, of a monomeric, 2-vinyl substituted-1,3-dioxacycloalkane of five to six annular atoms which 2-vinyl substituted compound has five to sixteen carbons, is hydrocarbon except for the two oxa oxygens, and has the unsaturation of the vinyl group as its only acyclic unsaturation.

8. Process of claim 7 wherein the catalyst is a peroxide catalyst.

9. Process which comprises irradiating with ultra-violet light a polymerizable composition comprising a peroxide catalyst, a vinylidene compound containing a carboxylic ester group, and 0.1 to 5%, based on said vinylidene compound, of a monomeric, 2-vinyl substituted-1,3-dioxacycloalkane of five to six annular atoms which 2-vinyl substituted compound has five to sixteen carbons, is hydrocarbon except for the two oxa oxygens, and has the unsaturation of the vinyl group as its only acyclic unsaturation.

10. Process of claim 9 wherein the peroxide catalyst is the peroxide of the cyclic acetal.

11. A polymerizate of a composition comprising a methacrylic acid ester and from 0.1 to 5%, based on the ester, of a monomeric, 2-vinyl substituted-1,3-dioxacycloalkane of five to six annular atoms which 2-vinyl substituted compound has five to sixteen carbons, is hydrocarbon except for the two oxa oxygens, and has the unsaturation of the vinyl group as its only acyclic unsaturation.

12. A polymerizate of a composition comprising a methacrylic acid ester and from 0.1 to 5%, based on the ester, of 2-vinyl-1,3-dioxolane.

13. A polymerizate of a composition comprising a methacrylic acid ester and from 0.1 to 5%, based on the ester, of 2-vinyl-4-methyl-1,3-dioxane.

RICHARD HAVEN WILEY.

REFERENCES CITED

The following references are of record in the file of this patent:

UNITED STATES PATENTS

| Number | Name | Date |
|---|---|---|
| 2,010,828 | Rothrock | Aug. 13, 1935 |
| 2,095,320 | Dreyfus | Oct. 12, 1937 |
| 2,129,666 | Barrett | Sept. 13, 1938 |
| 2,189,529 | Carothers | Feb. 6, 1940 |
| 2,194,405 | Purves | Mar. 19, 1940 |
| 2,279,436 | Berg | Apr. 14, 1942 |
| 2,297,351 | Gerhart | Sept. 29, 1942 |
| 2,382,640 | Kenyon | Aug. 14, 1945 |

FOREIGN PATENTS

| Number | Country | Date |
|---|---|---|
| 340,008 | Great Britain | Dec. 19, 1930 |
| 434,989 | Germany | Oct. 6, 1926 |

OTHER REFERENCES

Chem. Abst., vol. 23, page 5468 (1929). Abstract of Article in J. A. C. S. 51, pages 3115–3123.

Certificate of Correction

Patent No. 2,432,601.

December 16, 1947.

RICHARD HAVEN WILEY

It is hereby certified that errors appear in the printed specification of the above numbered patent requiring correction as follows: Column 1, lines 14 and 15, for the word "alphameth-ylene" read *alpha-methylene*; column 3, line 15, for "has been" read *had been*; column 4, line 37, in the table, first column thereof, for "$25_D{}^{25}$" read $n_D^{25}$; line 68; for "Index $_D{}^{25}$" read *Index* $n_D^{25}$; column 8, line 47, for "bend" read *bond*; line 50, for that portion of the formula reading "$(R_2CR_2)_n$" read $(R^2CR^2)_n$; and that the said Letters Patent should be read with these corrections therein that the same may conform to the record of the case in the Patent Office.

Signed and sealed this 16th day of March, A. D. 1948.

[SEAL]

THOMAS F. MURPHY,
*Assistant Commissioner of Patents.*